Aug. 24, 1937. A. LAZARUS 2,090,873
DEVICE FOR HEATING WATER OR MAKING STEAM BY FRICTION
Filed April 11, 1936
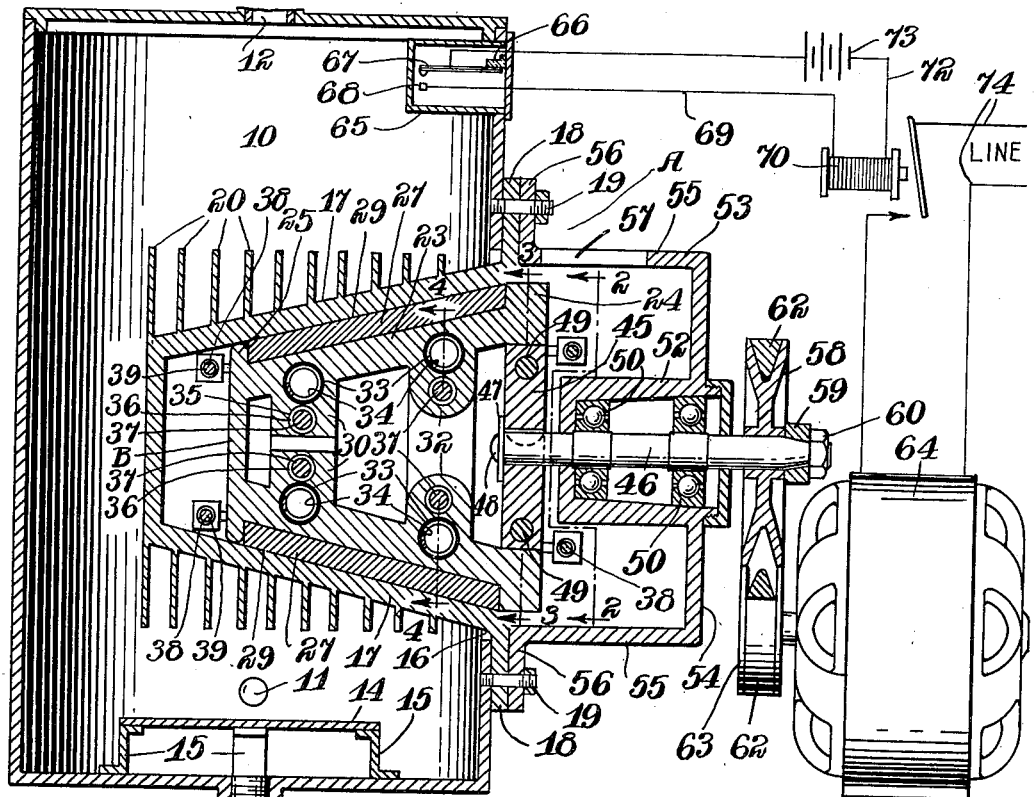
Fig. 1
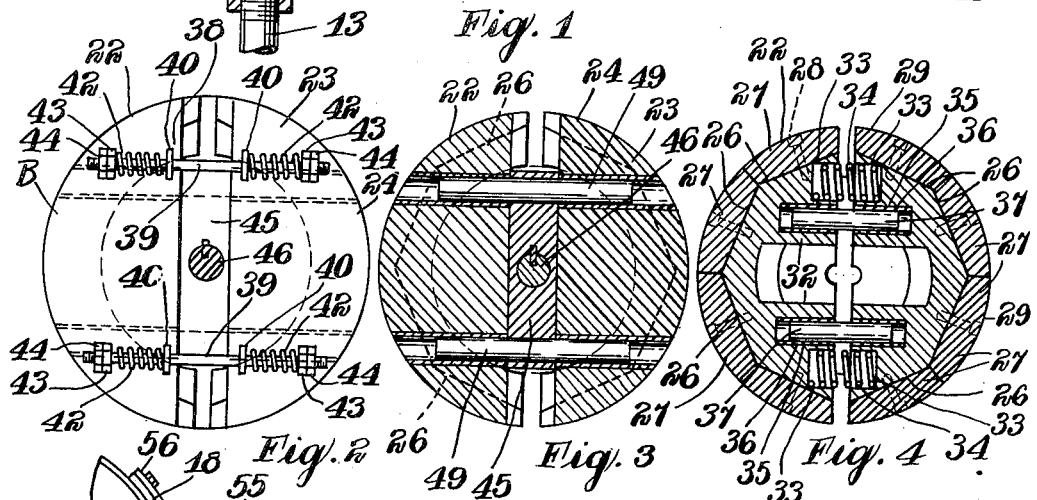
Fig. 2  Fig. 3  Fig. 4
Fig. 5
Inventor
Arthur Lazarus
By Howard Fischer
Attorney Patented Aug. 24, 1937

2,090,873

UNITED STATES PATENT OFFICE 2,090,873

DEVICE FOR HEATING WATER OR MAKING STEAM BY FRICTION

Arthur Lazarus, St. Paul, Minn.

Application April 11, 1936, Serial No. 73,973

4 Claims. (Cl. 122—26)

My invention relates to an improvement in a device for heating water or making steam by friction, and discloses a friction element movable in a heating unit such as a water tank for heating the water therein.

It is a purpose of my invention to provide a means for transferring heat generated by a rotatable or movable member directly into a heating medium with a minimum of waste, so that the heating medium may be economically used for heating a room or building. It is a purpose of my invention to provide a heat generating element such as a hollow cone made of metal or other suitable material which extends into direct contact with a heating fluid such as water and acts to heat the water to form steam, or for circulation through a heating system.

It is an object of my invention to use a friction element such as a cone or frustrum of a cone made preferably with a metallic base having a surface of lignum vitae or the like, which acts in co-operation with the heat generating element or the heat collecting element when the elements are moved relatively to one another to change the work energy into heat which is conveyed to the heating medium. A minimum of heat is lost from such an arrangement as the heat is transferred directly to the heating medium.

I have found that lignum vitae when used in combination with cast iron or other metal or suitable material will act to provide very efficient results. Not only is this material very hard to resist wear, but also the natural oils contained therein act to lubricate the cone just sufficiently to prevent binding of the core within the hollow cone. It is therefore a feature of my invention to provide a core made of lignum vitae for the best results, although, obviously other materials could be used.

It is a further feature of my invention to provide a means of controlling the friction heat generator means so that the same will operate when the water within the boiler is below a minimum predetermined temperature. The friction means will stop operation when the water reaches a certain predetermined temperature, and will start in operation again when the temperature drops below a predetermined temperature. Thus the driving means used for operation of the friction means is only used while the friction is in operation, and when the friction means is needed to raise the temperature of the heating medium.

It is a feature of my invention to so mount my friction generating device that the core is split, and is held flexibly together by means of coil springs interposed on opposite sides of the axis of the core. The core can in this way adjust itself to wear evenly on all sides. It is a further feature of my invention to provide a governor means connecting the two parts of the core, to regulate the spreading of these parts. This governor includes spring means which resists the spreading of the parts by the coil springs between the parts. This governing means may be adjusted so that any desired degree of centrifugal force may be required to spread the core into contact with the outer cone. Thus the friction device may be started into motion with the friction surfaces out of contact, to minimize the starting load of the motor. As soon as the core picks up speed, the core automatically expands into contact with the outer cone, producing friction.

Other novel features and objects of my invention will be more clearly and fully set forth in the following specification and claims.

In the drawing forming a part of my specification:

Figure 1 is a cross-sectional view through my heat generating unit and heating system.

Figure 2 is a cross-sectional view on the line 2—2 of Figure 1.

Figure 3 is a cross-sectional view on the line 3—3 of Figure 1.

Figure 4 is a cross-sectional view on the line 4—4 of Figure 1.

Figure 5 is a cross-sectional view on the line 5—5 of Figure 1.

My boiler A is in the form of a water-tight tank 10. The tank 10, as shown adapted for use with hot water systems, is provided with a feed water inlet 11, a hot water outlet 12, and a return pipe 13 extending thereinto. The return pipe 13 is secured in the bottom center of the tank 10, and immediately above this return pipe inlet, I provide a baffle plate 14 mounted on the bottom of the tank 10 by legs 15. This acts to spread the colder return water, and to permit the warmer water heated by my heating unit to rise centrally in the tank to the top thereof.

Extending through an aperture 16 on one side of the tank 10, is a frustro-conical heat transferring member or outer cone 17. A flange 18 extends about the larger end of this conical member 17, for attachment to the outside of the tank 10 by means of bolts 19. The heat transferring member 17 is provided with circular spaced fins 20 extending thereabout, to further disperse the heat generated by the heat transferring member to the heating medium surrounding the transferring unit 17 in the tank 10. The fins 20 aid in the dissemination of heat from the cone 17.

Within the heat transferring member 17, I provide a divided friction element B. The element B is formed to two members 22 and 23, each having a surface of friction material. The members 22 and 23 are virtually identical, and comprise a tapered frame having a substantially semi-circular flange 24 at one end thereof, and a smaller substantially circular flange 25 at the smaller end thereof. The frame between the flanges 24 and 25 is tapered, and is multi-sided, the sides 26 thereof being recessed or inset with respect to the flanges 24 and 25. The friction material is formed in tapered strips 27 secured to the frame by any suitable means such as by bolts 28, and is provided with an arcuate outer surface 29 which forms a conical, or frustro-conical member when secured in place.

Bosses or internally extending projections 30 and 32 project inwardly from the frame, and are formed integrally with the frame. Each of the bosses 30 and 32 are drilled to form recesses 33, each pair of recesses being equidistant from the center of the frame 22 or 23. Coil springs 34 are positioned in the recesses, each coil spring 34 extending from the base of one recess 33 in one member 22 to the base of another recess 33 in the complementary member 23. Thus four springs 34 are provided in two pairs, the springs of each pair being spaced equally from the center of the members 22 and 23.

Adjacent the recesses 33 are provided recesses 35, each of which is lined by a sleeve 36. The recesses 35 are also formed in two pairs, one pair of which extends into the bosses 30 and the other pair of which extends into the bosses 32. The recesses of each pair are equidistant from the longitudinal center of the members 22 and 23. Pins 37 are anchored in sleeves 36 in one of the members 22, and slide freely in the sleeves 36 of the other member 23. Thus the members 22 and 23 are arranged to move radially in opposite directions from the center, and are urged apart by the coil springs 34.

Counteracting the force of the coil springs 34, I provide governors 38. Two of these governors 38 are connected in parallel relationship to each end of the friction element B. These governors 38 are also in parallel relationship to the pins 37, and tend to counteract the springs 34.

Each governor 38 is formed of a rod 39 extending through bearings 40 one of which is mounted on the member 22, and the other of which is mounted on the member 23. Externally of the bearings 40, I provide coil springs 42 which may be adjusted by means of adjustment nuts 43, held in place by lock nuts 44. As the rod 39 can move freely through the bearings 40, the springs 42 resist the spreading of the members 22 and 23 at any desired amount of centrifugal force, but normally hold the members 22 and 23 together when the friction element B is at rest or travelling at slow speeds. As the governors 38 are spaced equally from the center, and are at each end of the element B, the force tending to hold together the members 22 and 23 is equalized.

Interposed between the substantially semi-circular flanges 24 on the members 22 and 23, I provide a driving member 45 keyed to the shaft 46. The member 45 is held in position on the shaft by means of a washer 47 held in place by a bolt 48. Pins 49 extend through the driving member 45 and are anchored therein. The pins extend outwardly on the opposite sides of the driving member, into apertures in the flanges 24. In this way, the two members 22 and 23 forming the friction element B are positively driven by the pins 49, regardless of whether the members 22 and 23 are close together, or spread apart considerably.

The shaft 46 is supported within anti-friction bearings 50 mounted in a sleeve 52 integral with the housing 53. The housing 53 is provided with a closed outer end 54 and a cylindrical portion 55 having a flange 56 thereon for attachment, with the heat transferring member, to the tank 10 by means of the bolts 19. An opening 57 in the cylindrical portion 55 of the housing 53 provides a means of adjusting the governors 38 without removing the housing element 53.

A pulley 58 is secured for rotation on the outer end of the shaft 46 and is held in place by a tapered sleeve 59 by means of a retaining nut 60. A belt 62 connects the pulley 58 with a pulley 63 on the motor 64 to drive the friction element B.

To control the motor 64, and to provide a means of shutting off the motor when the water in the tank 10 reaches a predetermined point, I provide a control which is sensitive to the temperature within the boiler A. A casing 65 extends into the body of the tank 10. Within this casing 65 I provide a bracket 66 of insulating material, upon which is mounted a thermostatic element 67, of bimetallic material. A wire is connected to the element 67, and a second wire extends to a contact 68 with which the element 67 contacts when the temperature of the water in the tank 10 falls below a certain predetermined degree. When the element 67 contacts the contact 68, a circuit is closed through these members, through the wire 69 to the relay 70, and through the wire 72 to the source of power 73 and back to the element 67. The movement of the relay 70 closes the line wires 74 to the motor 64. Thus the movement of the element 67 closes and opens the circuit to the motor.

The members 22 and 23 are preferably formed of aluminum alloys, but other suitable materials may be used. The friction material 27 is preferably lignum vitae, but other suitable material may also be used in this instance. The heat transferring member 17 is ordinarily formed of cast iron or the like.

Thus I have provided a heating tank 10 having a particular friction type of heating unit extending thereinto. This friction unit is operated by a suitable driving means, which driving means is controlled by thermostatic means. My heater will operate at a low cost with virtually no attention whatsoever, and without the danger of fire ordinarily accompanying the use of other means of heating water and the like, and without the loss of heat through gases passing up the chimney.

In accordance with the patent statutes I have described the principles of operation of my heater, and while I have endeavored to set forth the best embodiment thereof, I desire to have it understood that this is only illustrative of a means of carrying out my invention, and that obvious changes may be made within the scope of the following claims without departing from the spirit of my invention.

I claim:

1. A heating device comprising a hollow heat transferring member, a friction core extending thereinto, said friction core comprising two spaced core portions, and spring means mounted on either side of the axis of said core for urging said portions apart.

2. A heating device comprising a hollow heat transferring member, a friction core engageable therein, said core including a pair of co-operating members, pins extending from one of said members engageable loosely in the other of said members, and springs interposed on opposite sides of the axis of said core for resiliently forcing said co-operating members apart.

3. A heating device comprising, a heat transferring member of conical form, a friction element adapted to fit in frictional engagement with said heat transferring member and of frusto conical form, said friction element being divided longitudinally into a plurality of similar and relatively movable portions, means for guiding said portions of said friction element radially to contact with said heat transferring member, spring actuated governors mounted on the ends respectively of said friction element and connected to said portions to normally retract the same relative to said heat transferring member, said portions of said element being operable by centrifugal force, in opposition to said governors, to frictionally engage said heat transferring member and power driven means for rotating said friction element.

4. A heating device comprising, a heat transferring member of conical form, a friction element adapted to fit within said heat transferring member and of frusto conical form, said friction element being divided longitudinally into a plurality of similar and relatively movable portions, resilient means located near opposite ends respectively of said element tending to extend said portions to contact with said heat transferring member, spring actuated governors mounted on the ends respectively of said friction element and connected to said portions to normally retract said portions relative to said heat transferring member, said portions of said element being operable by centrifugal force, in opposition to said governors, to frictionally engage said heat transferring member and power driven means for rotating said friction element.

ARTHUR LAZARUS.